United States Patent
Fang et al.

(10) Patent No.: US 11,764,554 B2
(45) Date of Patent: Sep. 19, 2023

(54) INSTALLATION DEVICE FOR AIR GAP ARRESTER AND INSTALLATION METHOD THEREOF

(71) Applicant: State Grid Jinhua Power Supply Company, Zhejiang (CN)

(72) Inventors: Yuqun Fang, Zhejiang (CN); Yunpeng Guo, Zhejiang (CN); Chi Yu, Zhejiang (CN); Zhiyi Wang, Zhejiang (CN); Jianye Cui, Zhejiang (CN); Wendong Jiang, Zhejiang (CN); Bo Zhang, Zhejiang (CN); Bin Wang, Zhejiang (CN); Weinan Qin, Zhejiang (CN); Kaimei Zhao, Zhejiang (CN)

(73) Assignee: State Grid Jinhua Power Supply Company, Jinhua (CN)

( * ) Notice: Subject to any disclaimer, the term of this patent is extended or adjusted under 35 U.S.C. 154(b) by 531 days.

(21) Appl. No.: 17/109,195

(22) Filed: Dec. 2, 2020

(65) Prior Publication Data

US 2021/0083460 A1    Mar. 18, 2021

Related U.S. Application Data

(63) Continuation-in-part of application No. PCT/CN2020/109091, filed on Aug. 14, 2020.

(30) Foreign Application Priority Data

Sep. 4, 2019 (CN) .......................... 201910832785.1

(51) Int. Cl.
*H02G 1/04* (2006.01)
*H02G 13/00* (2006.01)

(52) U.S. Cl.
CPC ............... *H02G 1/04* (2013.01); *H02G 13/00* (2013.01)

(58) Field of Classification Search
CPC ............. H02G 1/02; H02G 1/04; H02G 13/00
(Continued)

(56) References Cited

U.S. PATENT DOCUMENTS 4,864,455 A * 9/1989 Shimomura ........... H01H 85/44
337/34

FOREIGN PATENT DOCUMENTS

CN    203277685 U  * 11/2013
CN    104201614 A  * 12/2014
(Continued)

OTHER PUBLICATIONS

Machine translation of Diao et al. Chinese Patent Document CN 106786160 A May 31, 2017 (Year: 2017).*
(Continued)

*Primary Examiner* — Kevin J Comber

(57) ABSTRACT

Disclosed are an installation device for air gap arrester and installation method thereof. The installation device includes a handheld pole, a wire clamping mechanism provided at the bottom end of the handheld pole for clamping a split wire, a tray provided on the handheld pole for lifting the arrester, an insulating rope provided on the tray, a fixing rope provided on the handheld pole for temporarily fixing the arrester, and a scale provided on the handheld pole for measuring the distance from the bottom end of the arrester to the bottom end of the handheld pole. The installation device for air gap arrester and installation method thereof have high installation efficiency.

18 Claims, 15 Drawing Sheets

(58) Field of Classification Search
USPC .......................................... 361/117, 124, 125
See application file for complete search history.

(56) References Cited

FOREIGN PATENT DOCUMENTS

CN        106786160 A  *  5/2017
JP        2013175312 A  *  9/2013

OTHER PUBLICATIONS

Machine translation of Chen et al. Chinese Patent Document CN 104201614 A Dec. 10, 2014 (Year: 2014).*
Machine translation of Liu et al. Chinese Patent Document CN 203277685 U Nov. 6, 2013 (Year: 2013).*
Machine translation of Teramoto Japanese Patent Document JP 2013175312 A Sep. 5, 2013 (Year: 2013).*

* cited by examiner

11,764,554 B2

INSTALLATION DEVICE FOR AIR GAP ARRESTER AND INSTALLATION METHOD THEREOF

CROSS REFERENCE TO RELATED APPLICATIONS

The present application is a Continuation-In-Part Application of PCT Application No. PCT/CN2020/109091 filed on Aug. 14, 2020, which claims the benefit of Chinese Patent Application No. 201910832785.1 filed on Sep. 4, 2019. All the above are hereby incorporated by reference in their entirety.

FIELD

The present disclosure belongs to the technical field of arrester installation, more particular, to an installation device for air gap arrester and installation method thereof.

BACKGROUND

The air gap arrester has only air gaps, with no other objects to be used for supporting during installation. Restricted by the mechanical strength of the arrester body, the arrester can only be installed vertically. The gap size and body size of the arrester are fixed, and the length of the line insulator strings will vary according to different regions and terrain. Therefore, during installation, different auxiliary tooling must be temporarily processed according to the installation position and the shape of the tower to meet the installation requirements. Therefore, the installation efficiency is low.

SUMMARY

The purpose of the present disclosure is to overcome the shortcomings of low installation efficiency in the prior art, and to provide an installation device for air gap arrester and installation method thereof with high installation efficiency.

In order to achieve the above purpose, the present disclosure adopts the following technical solutions.

An installation device for air gap arrester includes a handheld pole, a wire clamping mechanism provided at the bottom end of the handheld pole for clamping a split wire, a tray provided on the handheld pole for lifting the arrester, an insulating rope provided on the tray, a fixing rope provided on the handheld pole for temporarily fixing the arrester, and a scale provided on the handheld pole for measuring the distance from the bottom end of the arrester to the bottom end of the handheld pole. When on the ground, the gap size (the distance from the tray to the bottom end of the handheld pole) required to be reserved is set in advance, and then the installation is performed on the cross arm. The split wire is clamped by the wire clamping mechanism at the bottom of the handheld pole, and then the arrester is fixed on the cross arm. The installation efficiency is high.

Preferably, an adjusting sleeve is sleeved on the handheld pole, an adjusting bolt is threadedly connected to the adjusting sleeve, the end of the adjusting bolt abuts against the handheld pole, and the tray is fixedly connected to the adjusting sleeve. The adjusting sleeve is fixed on the handheld pole by tightening the adjusting bolt. When the adjusting bolt is loosened, it facilitates the adjustment of the position of the adjusting sleeve on the handheld pole, so as to adapt to arresters with different gaps.

Preferably, a limit ring is fixedly connected to the handheld pole, the fixing rope passes through the limit ring, and the limit ring restricts the fixing rope from sliding.

Preferably, a handle is provided at the top end the handheld pole, with a second limit protrusion provided at an end of the handle close to the handheld pole. Both the handheld pole and the handle are made of insulating materials, and the second limit protrusion can prevent the person's hand from holding too low or getting an electric shock.

Preferably, the wire clamping mechanism includes a bottom plate, and the lower edge of the bottom plate is provided with a wire groove. Sliding sleeves are slidably connected on both sides of the wire groove to the bottom plate. The inner side wall of the sliding sleeve is cylindrical and provided with annular serrations coaxial with the inner side wall of the sliding sleeve. The serrations include closely arranged teeth. The tooth includes a tooth edge and a guide slope. Some of the guide slopes are odd guide slopes, and the other of the serrations are even guide slopes. The odd guide slopes and the even guide slopes are arranged at interval. An end of the even guide slope close to the wire groove is provided with sliding grooves extending toward the wire groove. A sliding rod is inserted into the sliding sleeve on the side away from the wire groove. The sliding rod is cylindrical, and the outer surface of the sliding rod is provided with protrusions in an annular array around the axis of the sliding rod that are adapted to the sliding grooves. The number of the protrusions is the same as the number of the even guide slopes. The end of the protrusion close to the wire groove is provided with a second guide slope that is adapted to the guide slope. The second guide slope abuts against the bottom of the guide slope or the sliding groove. A second sliding rod of cylindrical shape is inserted into the sliding sleeve at the end close to the wire groove, and the second sliding rod is slidably connected to the sliding sleeve. The outer surface of the second sliding rod is provided with a guiding projection. The inner side wall of the sliding sleeve is provided with a second sliding groove parallel to the axis of the inner side wall of the sliding sleeve. The guiding projection is located inside the second sliding groove and is slidably connected to the second sliding groove. The end of the second sliding rod away from the sliding rod is rotatably connected with a roller, and the end of the second sliding rod close to the sliding rod is provided with a slot. A spring is provided in the slot. One end of the spring is connected to the sliding rod and the other end of the spring is connected to the bottom of the slot. The end of the second sliding rod close to the sliding rod is provided with annular third serrations. The third serrations include second teeth. The second tooth includes a second tooth edge and a third guide slope for guiding the second guide slope from the guide slope where it is located to the third guide slope of the adjacent guide slope. An annular protrusion is provided at the end of the inner side wall of the sliding groove away from the wire groove. The sliding sleeve is provided with a second spring. One end of the second spring abuts against the annular protrusion, and the other end of the second spring abuts against the protrusion. When the second guide slope is at the bottom of the sliding groove, the second guide slope abuts against the third guide slope. The bottom plate is provided with a limit protruding bar for preventing the sliding sleeve from sliding along the bottom plate and preventing the second sliding rod from sliding along the sliding sleeve. The bottom plate is provided with a third spring for driving the sliding sleeve to slide in the direction towards the handheld pole. The wire clamping mechanism is convenient for wire clamping, and has good clamping effect.

Preferably, a fixing block is fixedly connected to the bottom plate; the fixing block is located on a side of the sliding sleeve close to the handheld pole; the third spring is located between the fixing block and the sliding sleeve, and two ends of the third spring are respectively connected to the fixing block and the sliding sleeve. The structure is simple.

Preferably, the length direction of the limit protruding bar is consistent with a sliding direction of the sliding sleeve; when the second guide slope abuts against the guide slope, the sliding rod abuts against a bottom end of the limit protruding bar, and when the second guide slope abuts against a bottom of the sliding groove, the sliding rod abuts against a side surface of the limit protruding bar. The structure is simple.

Preferably, the bottom end of the handheld pole is rotatably connected to a coaxial shaft, and an upper edge of the bottom plate is fixedly connected to the shaft. After fixing the arrester, turn the handheld pole and then pull the handheld pole upward.

Preferably, the end of the sliding rod close to the second sliding rod is inserted into the slot and slidably connected to the slot. The sliding rod is inserted into the slot to play a guiding role and increase stability.

An installation method for air gap arrester include the following steps. Step a, on the ground, slide the adjusting sleeve to adjust the distance from the adjusting sleeve to the bottom end of the handheld pole, tighten the adjusting bolt, place a bottom end of the arrester on the tray, and tie the arrester with the fixing rope passing through the limit ring. Step b, lift the arrester and the installation device for the air gap arrester by a ground personnel with a pulley block to a cross arm, the electrician on the cross arm receiving the arrester and the installation device and preparing a position for installation. Step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire. Step d, install a low-voltage end of the arrester on the cross arm with bolts by the electrician; after confirming that it is correct, untie the fixing rope, and recover the installation device for air gap arrester.

The beneficial effects of the present disclosure are that it provides an installation device for air gap arrester and installation method with high installation efficiency, good stability and thread clamping effect.

Figure 1:
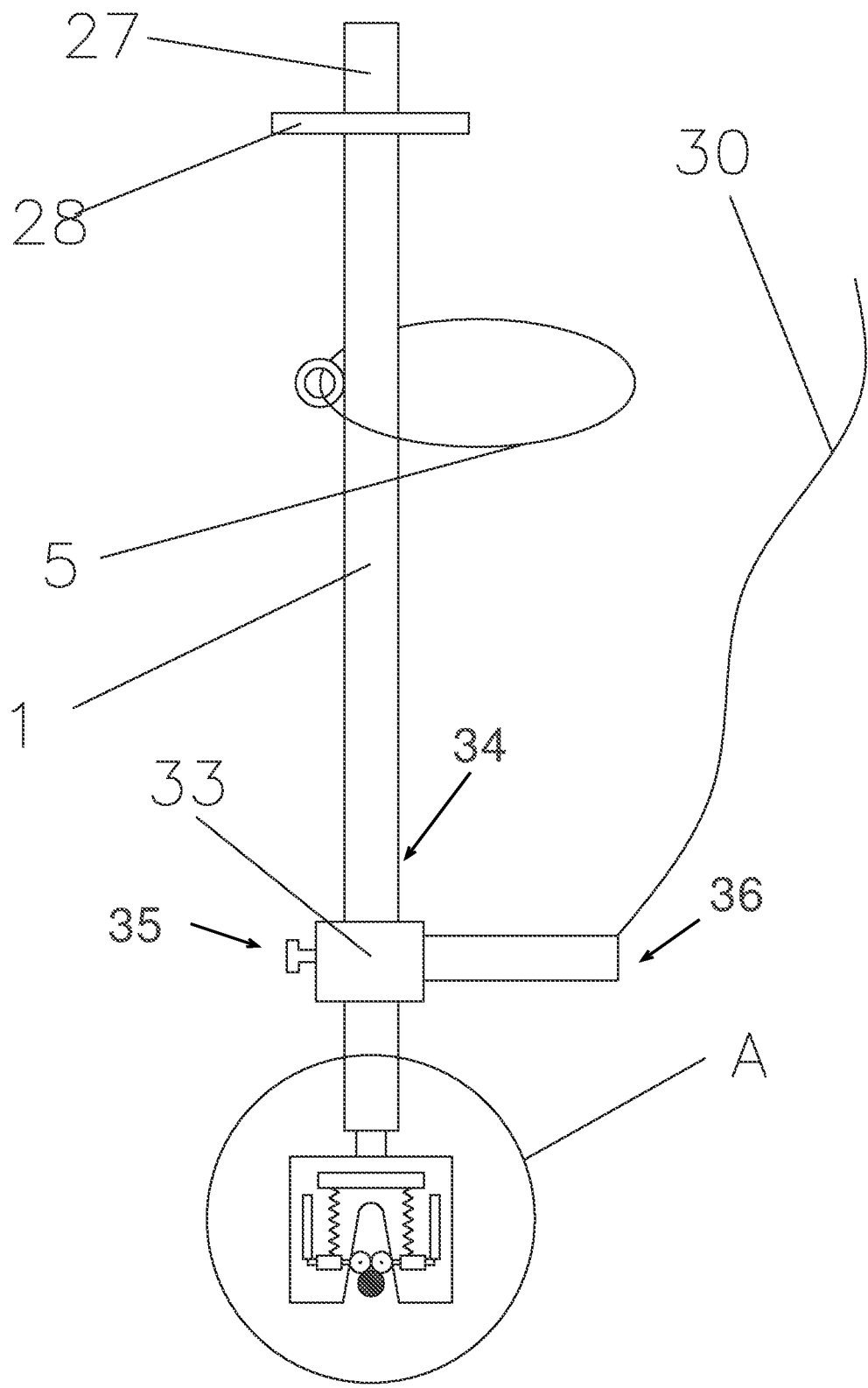
FIG. 1 is a schematic diagram of Embodiment 1.
Figure 2:
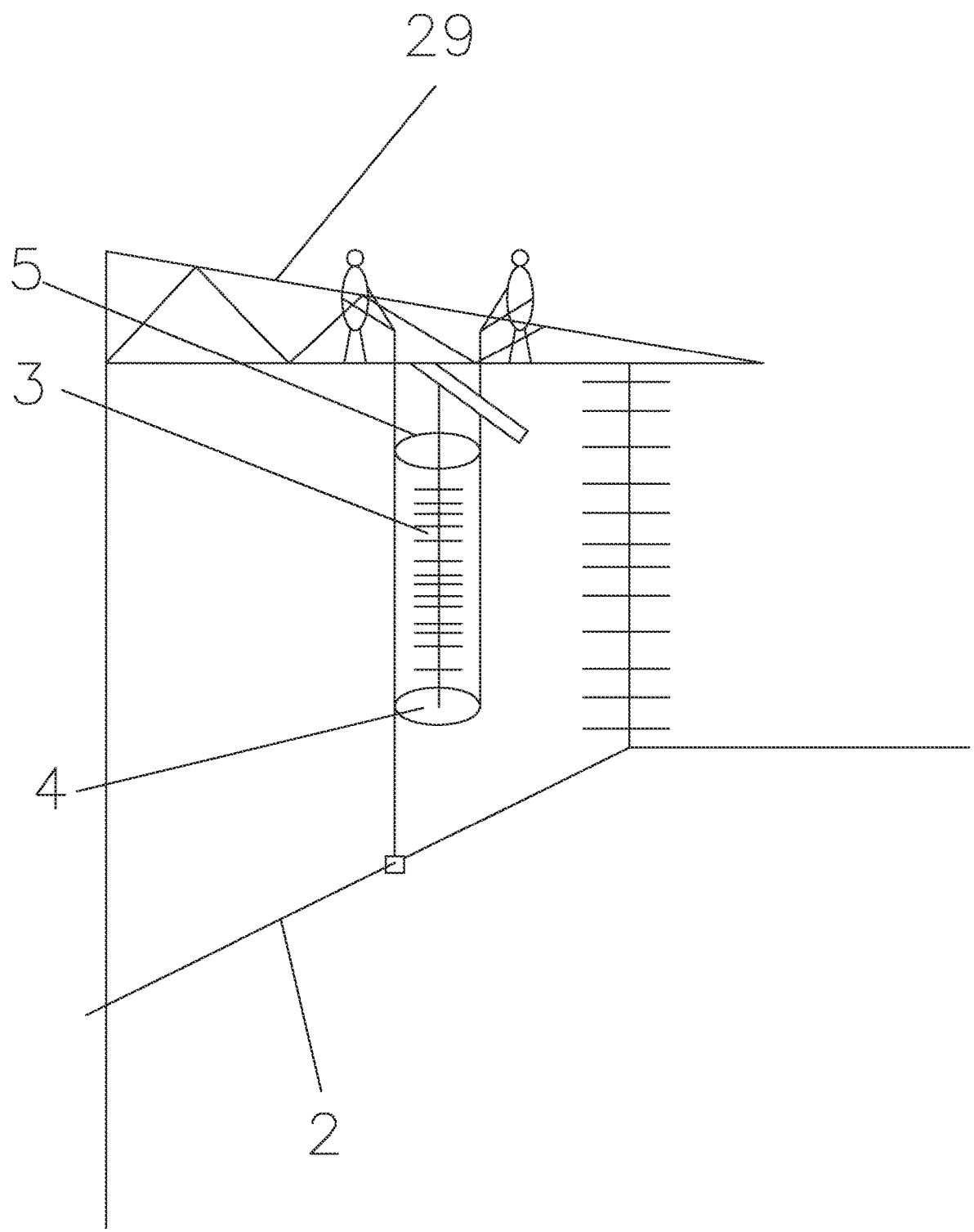
FIG. 2 is a schematic diagram illustrating the fixing of the arrester of Embodiment 2.
Figure 3:
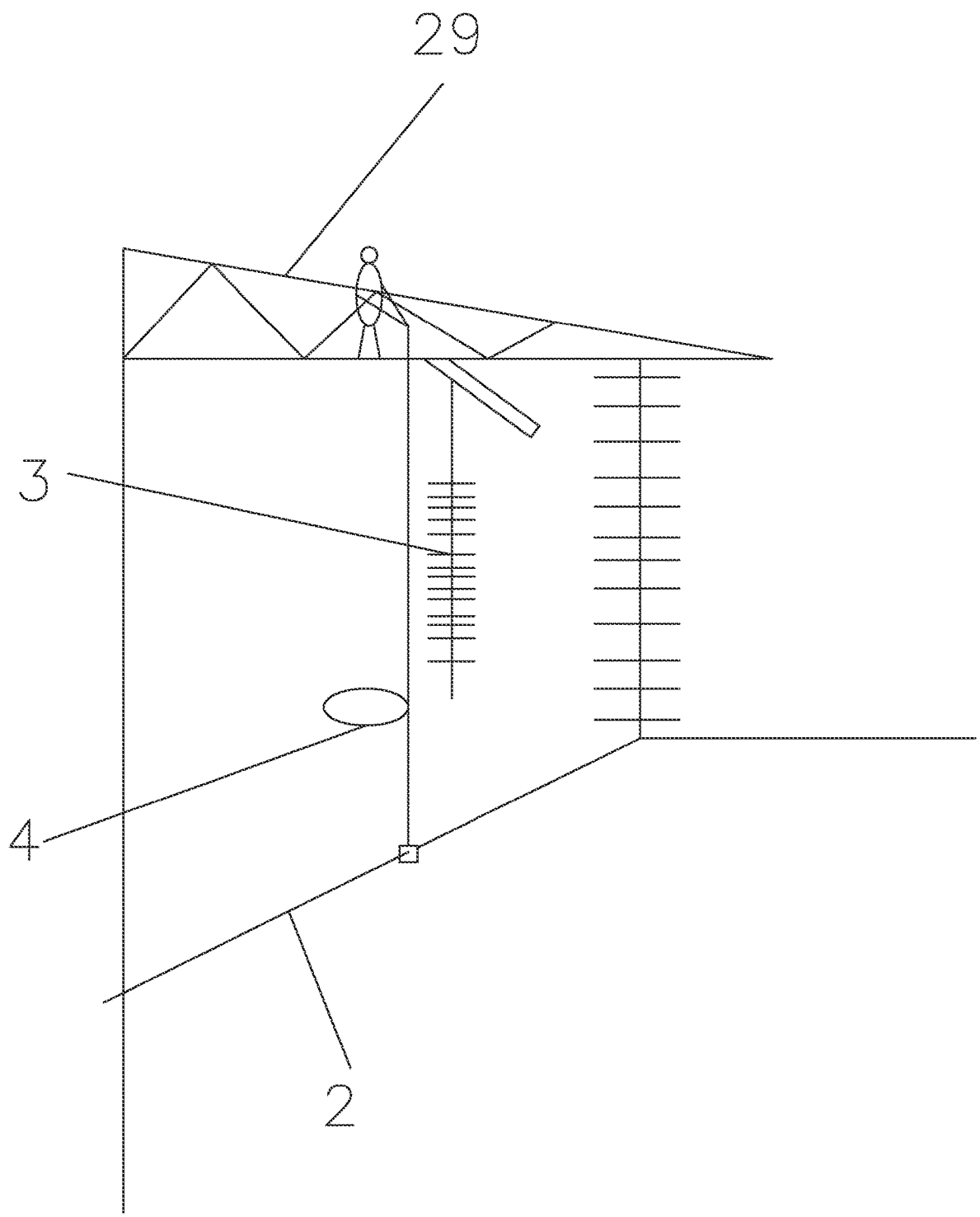
FIG. 3 is a schematic diagram illustrating the rotating of the handheld pole of Embodiment 2.
Figure 4:
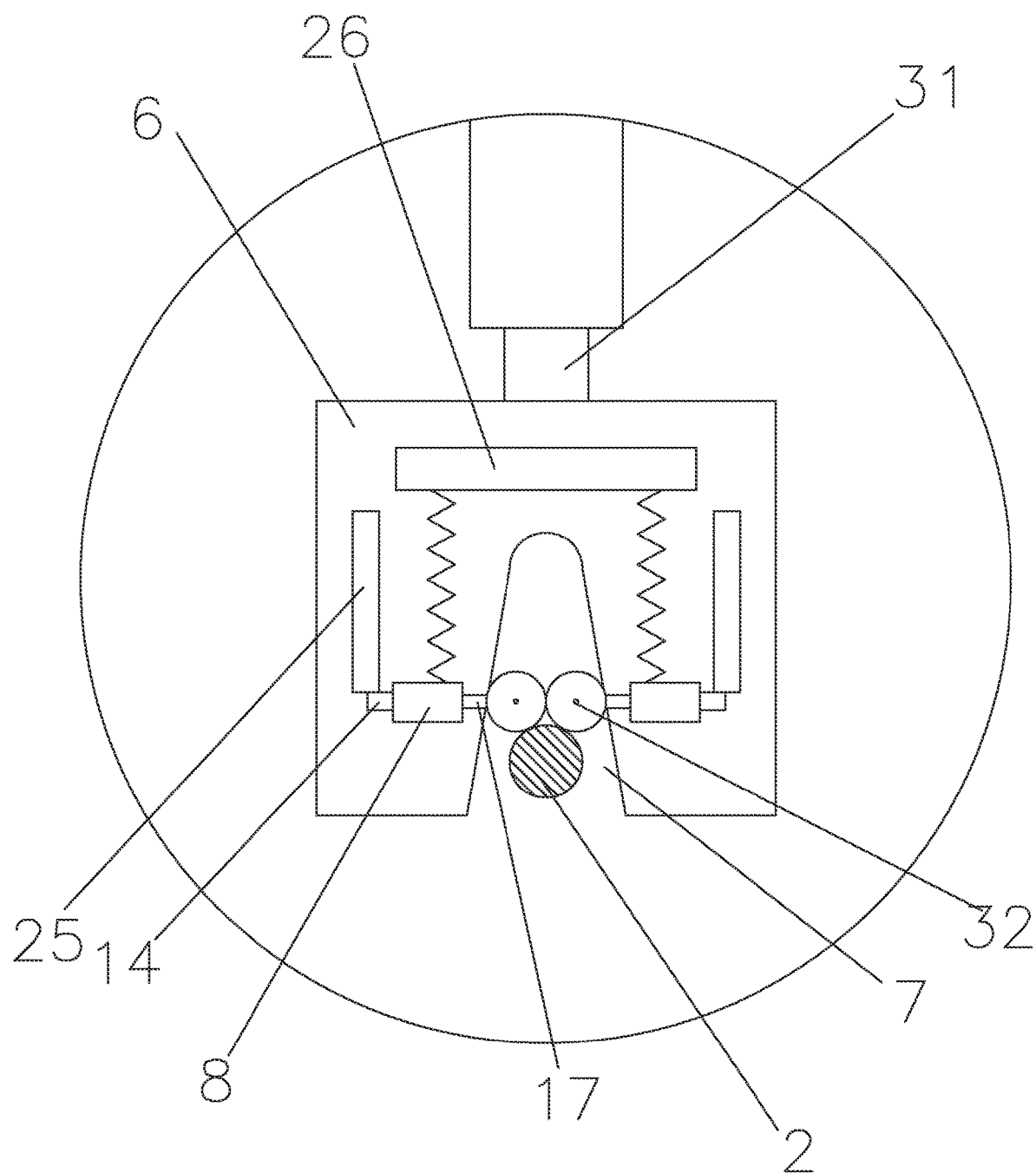
FIG. 4 is an enlarged view of A in FIG. 1.
Figure 5:
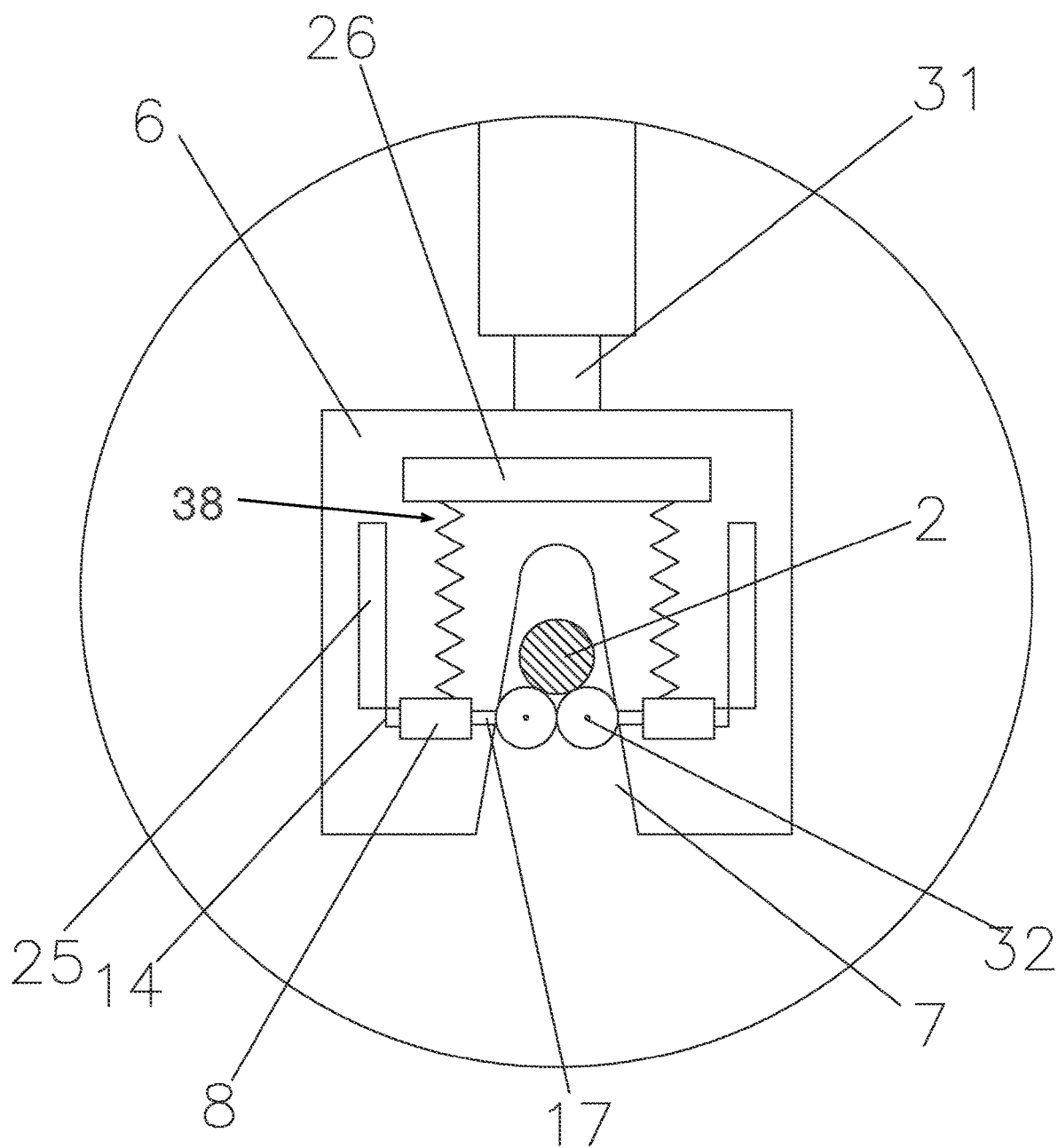
FIG. 5 is a schematic diagram illustrating the split wire passing through the rollers.
Figure 6:
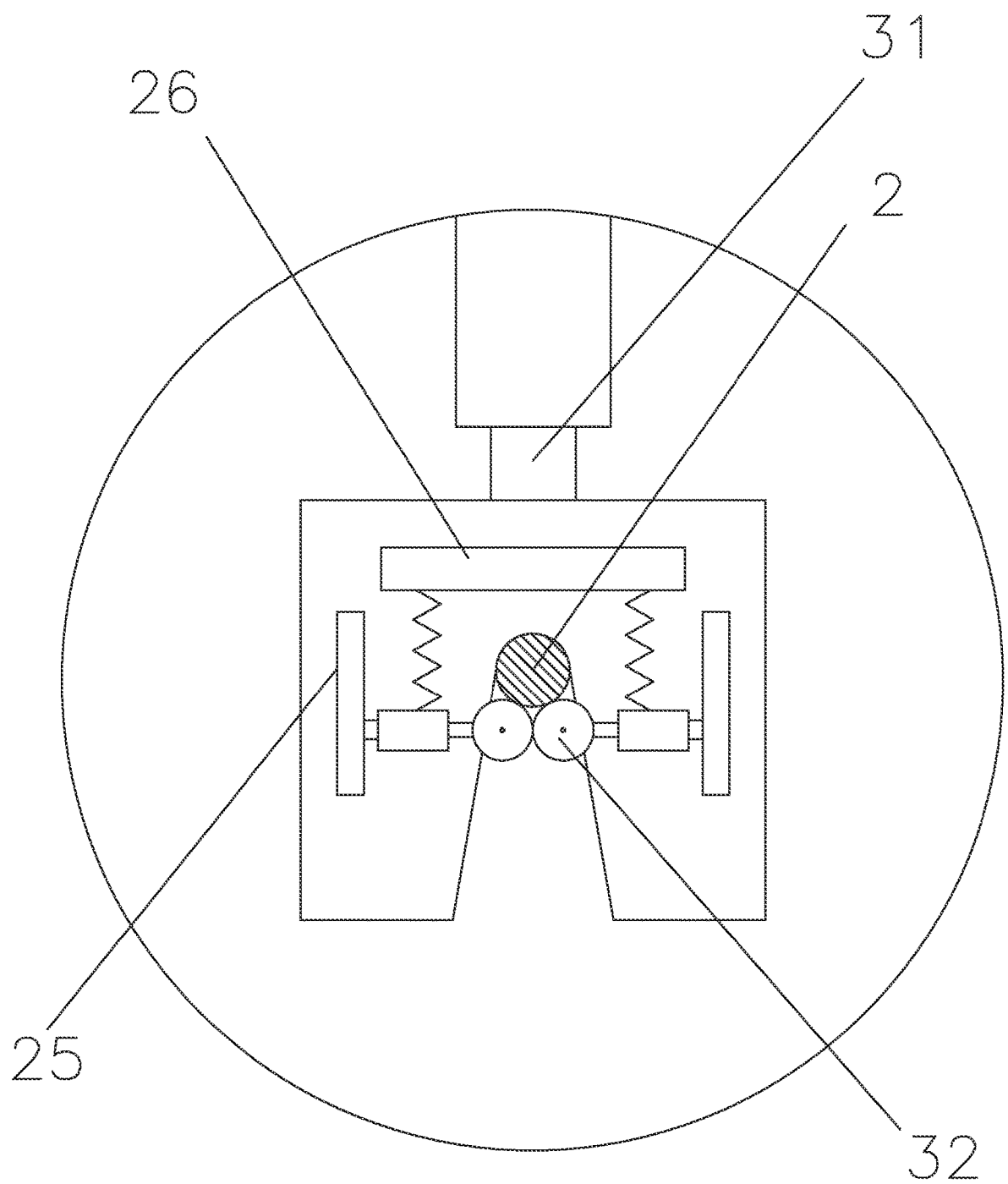
FIG. 6 is a schematic diagram illustrating the split wire being clamped.
Figure 7:
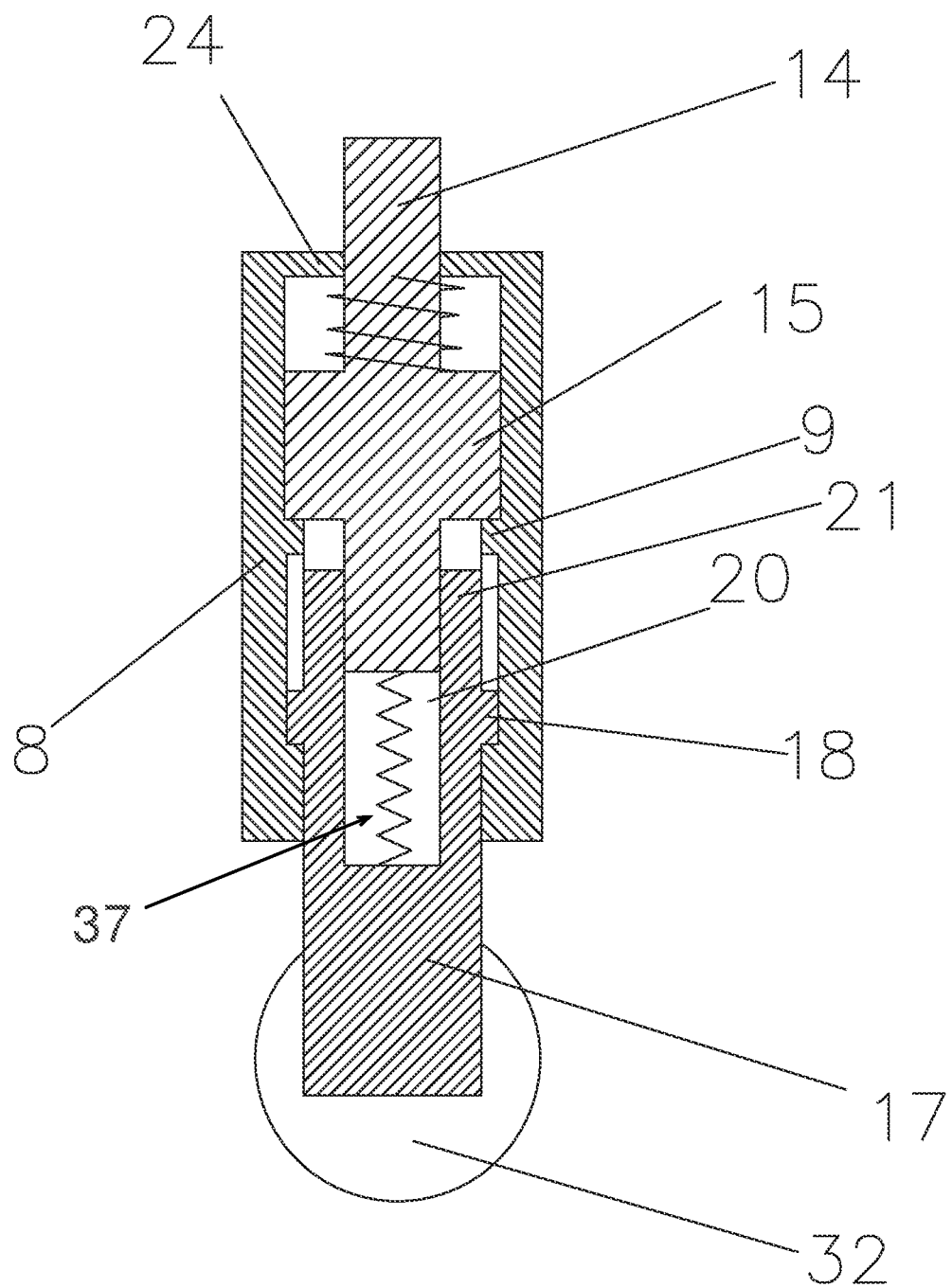
FIG. 7 is a cross-sectional view of the sliding rod, the second sliding rod, and the sliding sleeve.
Figure 8:
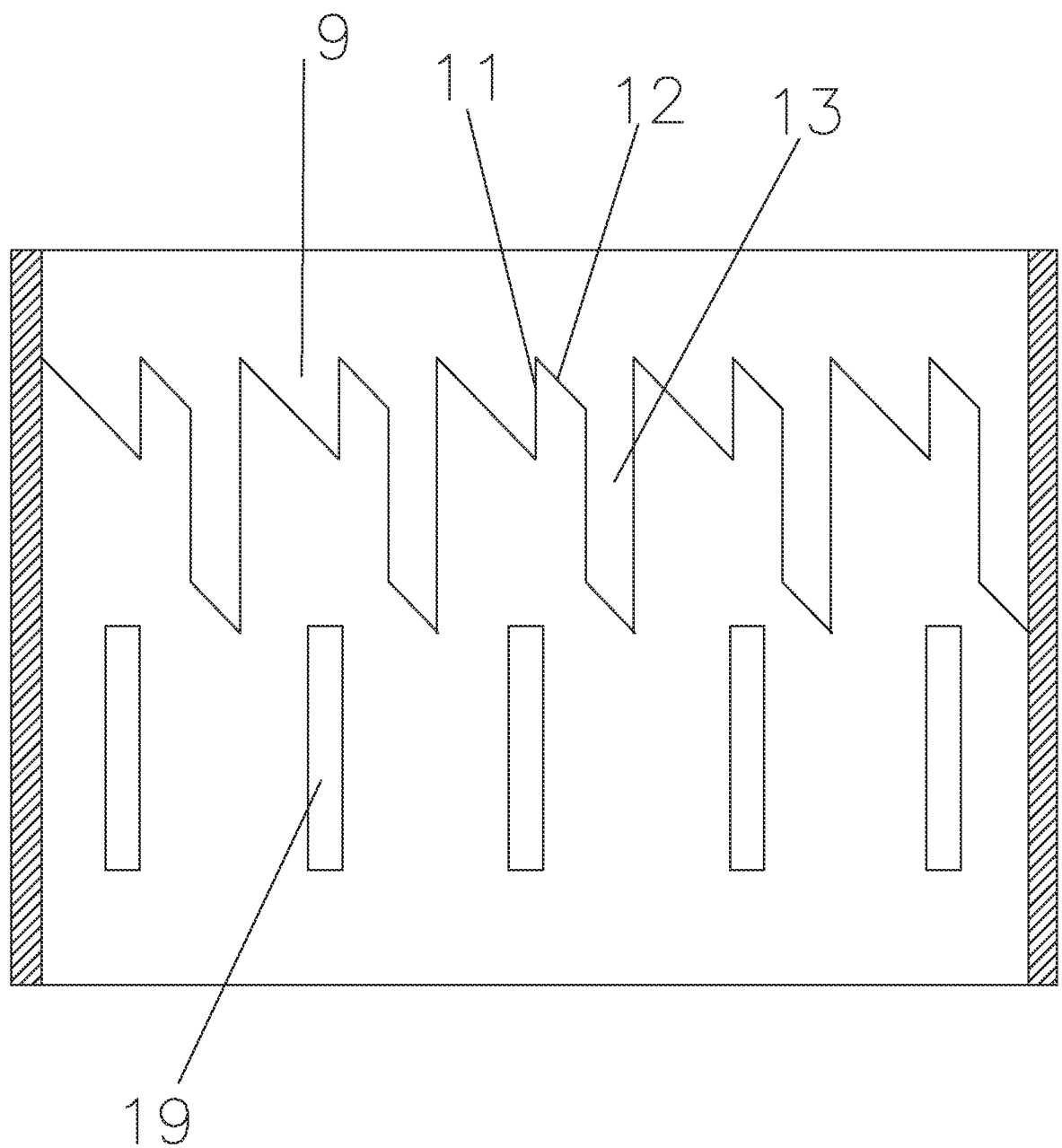
FIG. 8 is a plan view of the sliding sleeve.
Figure 9:
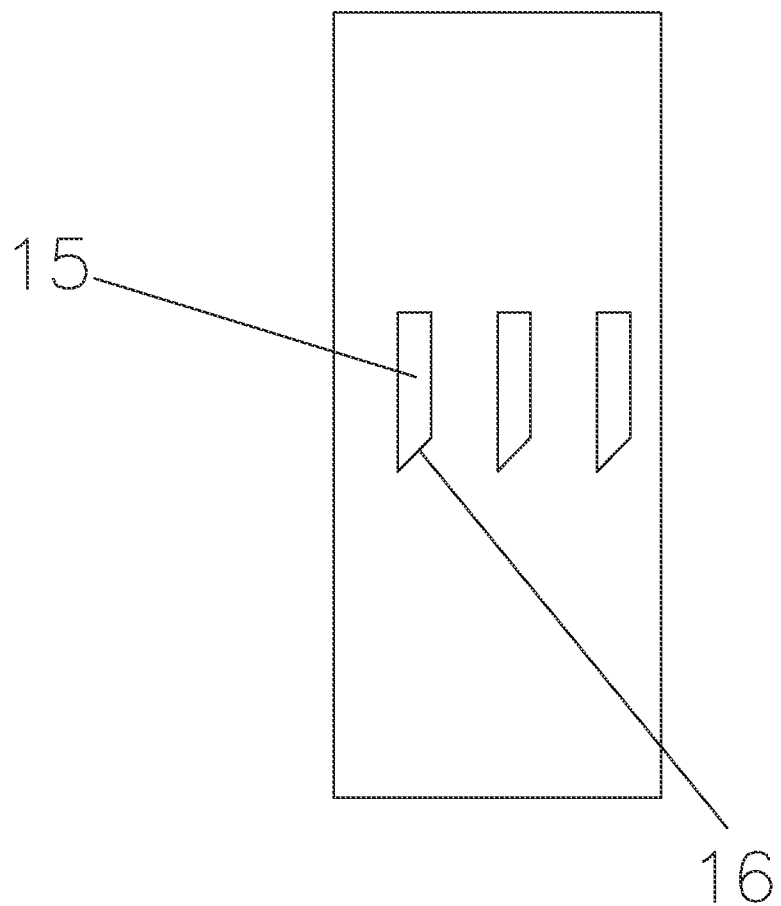
FIG. 9 is a schematic diagram of a sliding rod.
Figure 10:
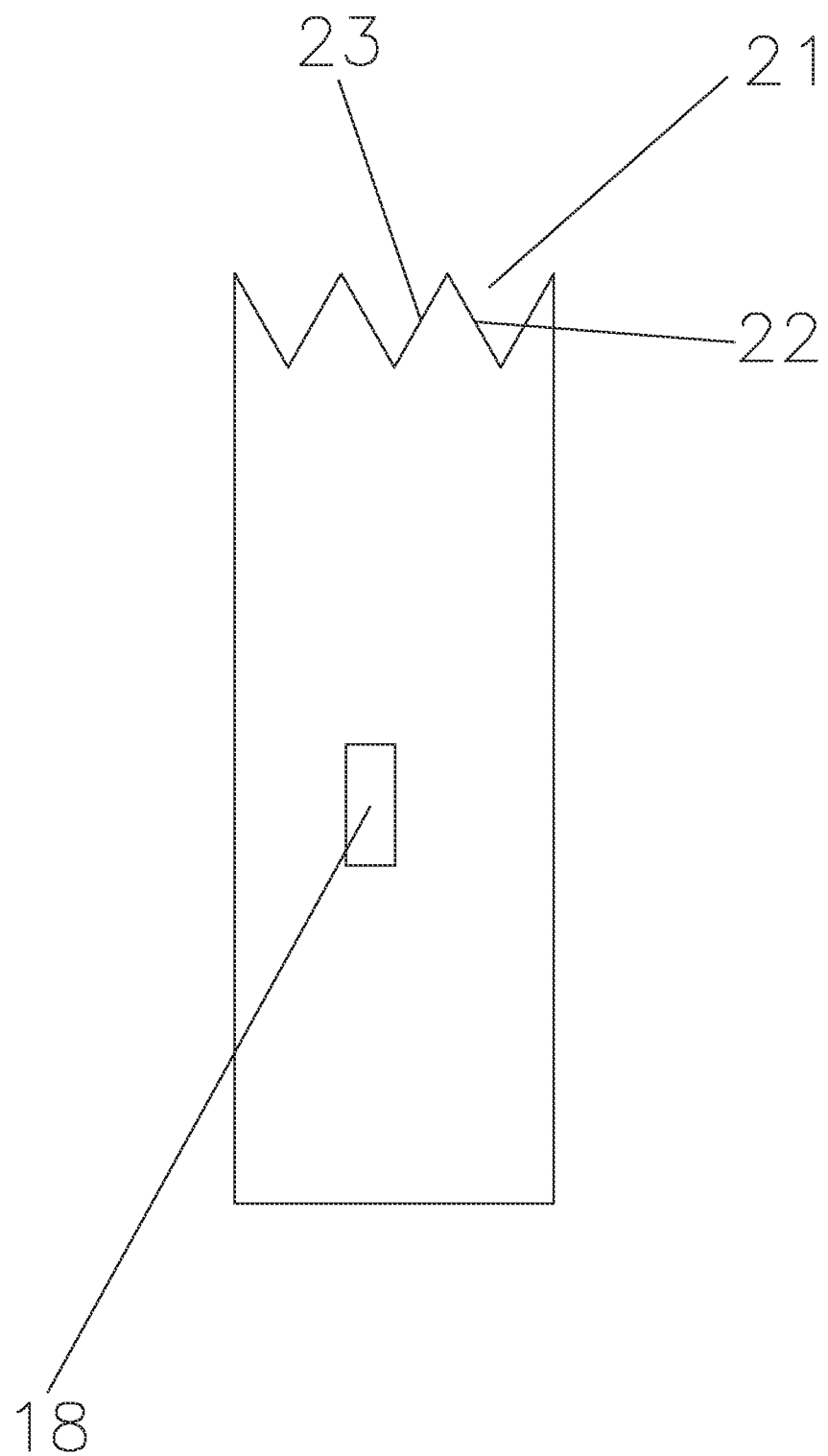
FIG. 10 is a schematic diagram of a second sliding rod.
Figure 11:
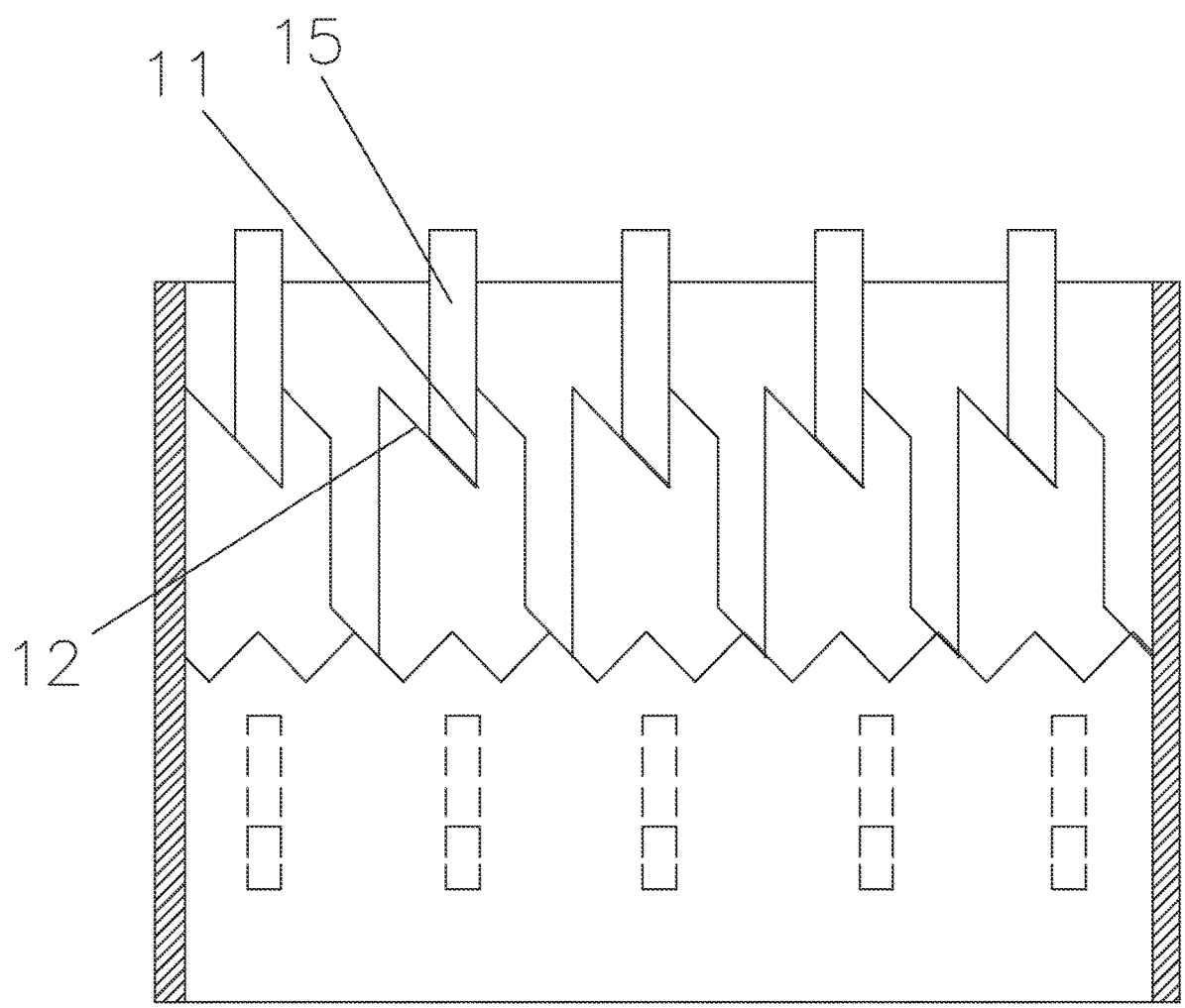
FIG. 11 is a schematic diagram illustrating the second guide slope abutting against the guide slope when the sliding rod is exposed outside the sliding sleeve for a long length.
Figure 12:
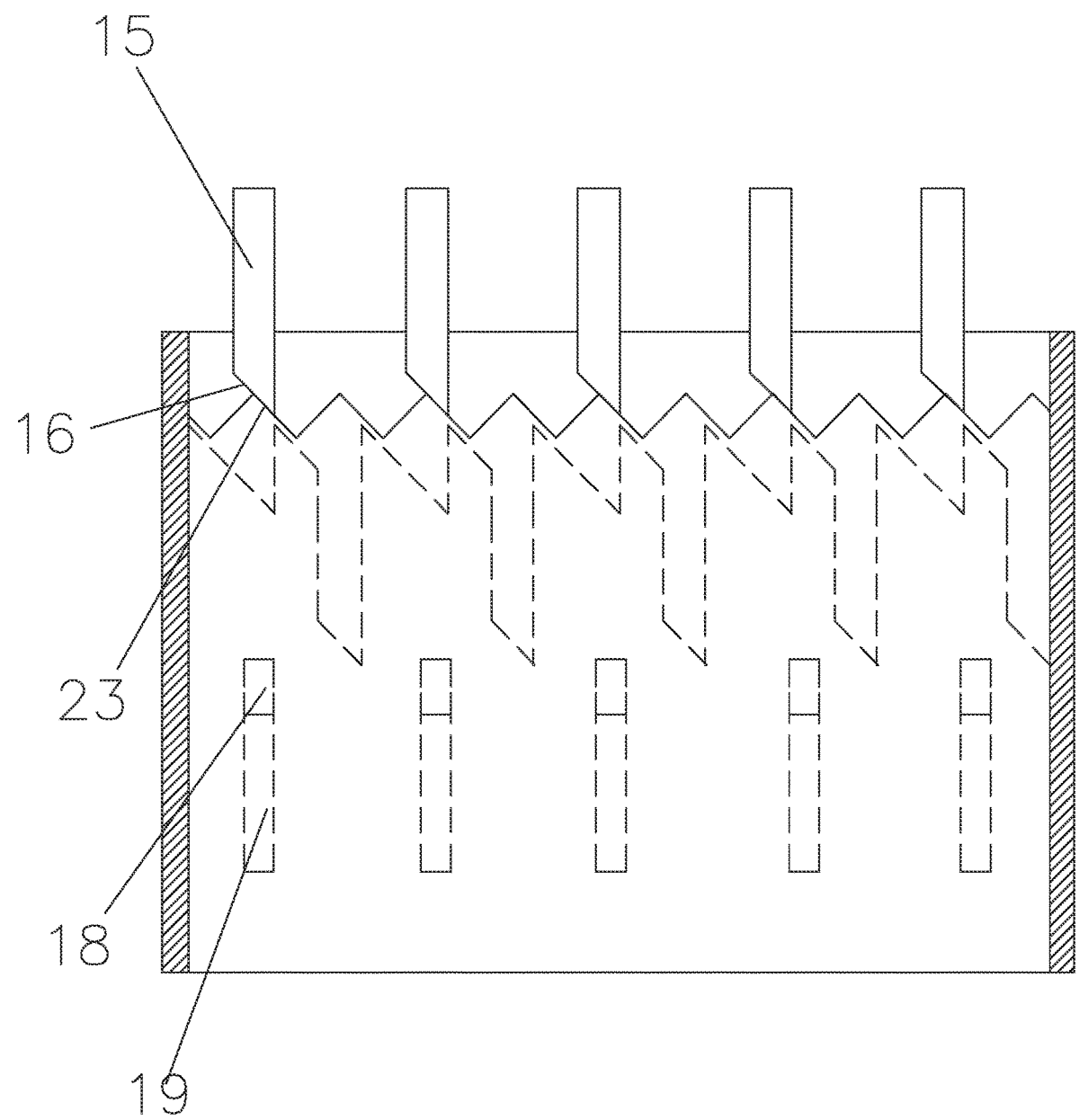
FIG. 12 is a schematic diagram illustrating the third guide slope pushing the second guide slope.
Figure 13:
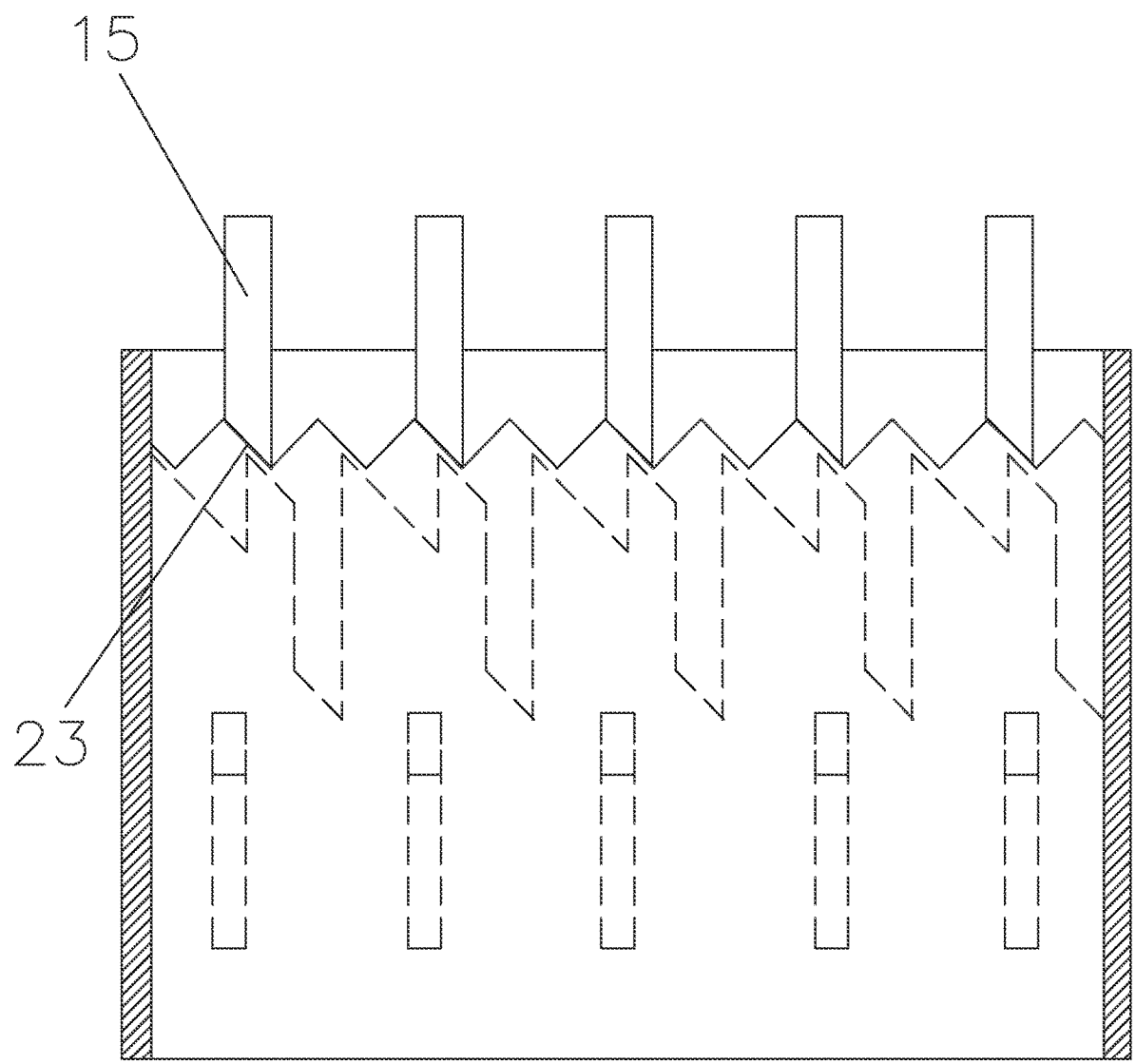
FIG. 13 is a schematic diagram illustrating the second guiding slope sliding along the third guiding slope.
Figure 14:
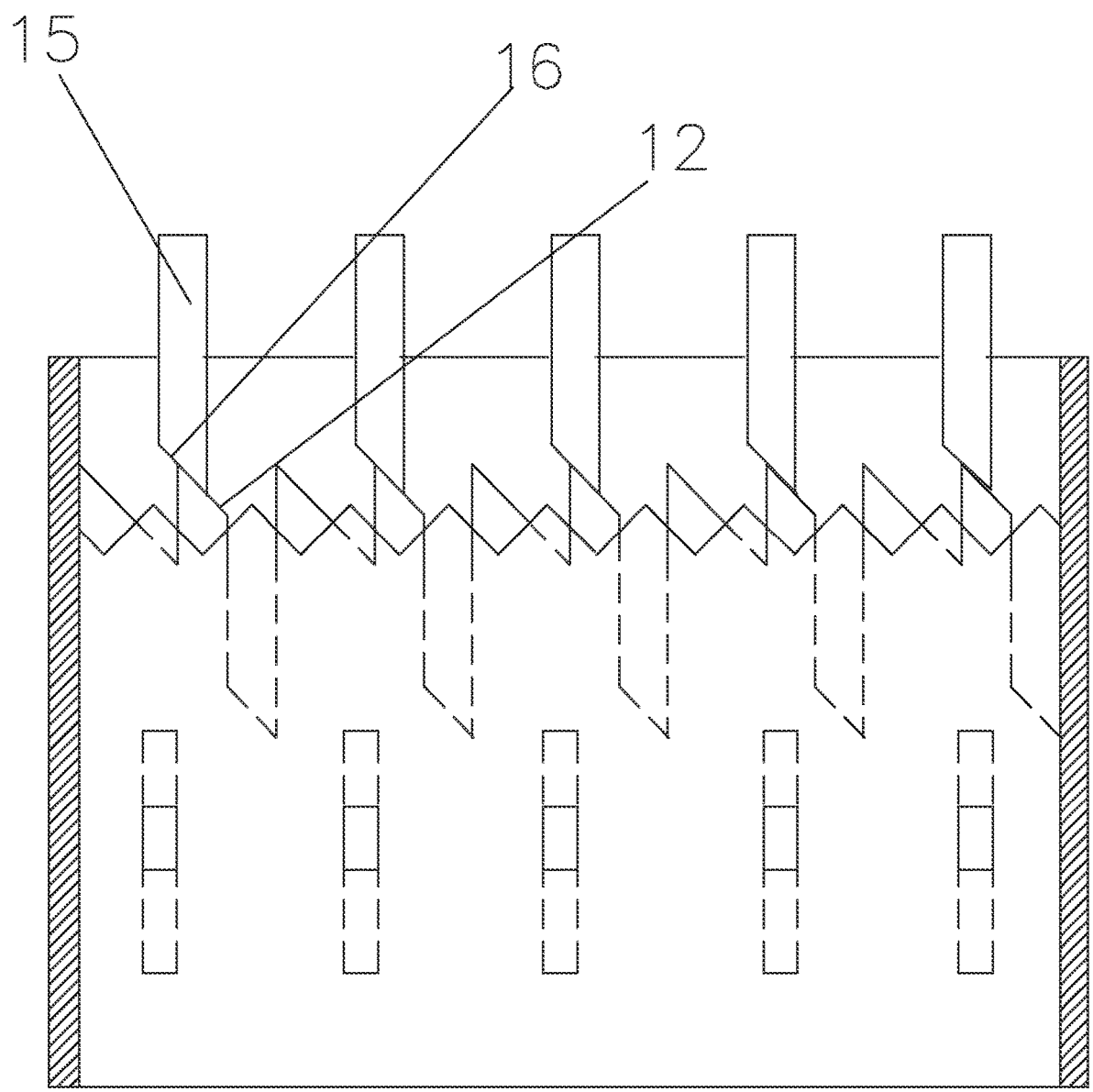
FIG. 14 is a schematic diagram illustrating the second guide slope abutting against the guide slope.
Figure 15:
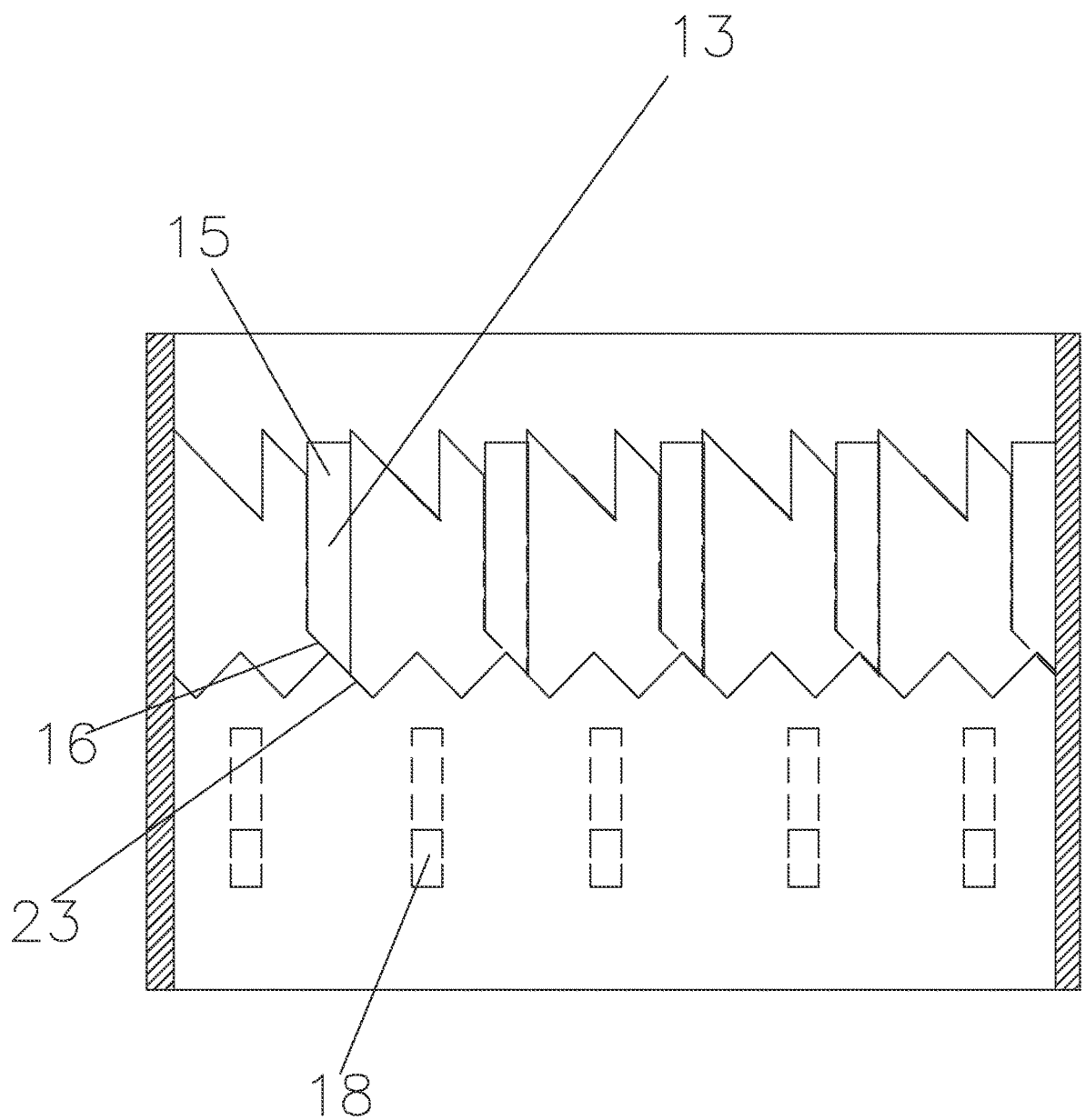
FIG. 15 is a schematic diagram illustrating the second guiding slope sliding along the guiding slope and finally sliding to the bottom of the slot along the sliding groove and abutting against the third guiding slope.

REFERENCES IN THE FIGURES handheld pole 1, split wire 2, arrester 3, tray 4, fixing rope 5, bottom plate 6, wire groove 7, sliding sleeve 8, serration 9, tooth edge 11, guide slope 12, sliding groove 13, sliding rod 14, protrusion 15, second guide slope 16, second sliding rod 17, guide projection 18, second sliding groove 19, slot 20, third serration 21, second tooth edge 22, third guide slope 23, annular protrusion 24, limit protruding bar 25, fixing block 26, handle 27, second limit protrusion 28, cross arm 29, insulating rope 30, rotating shaft 31, roller 32, and adjusting sleeve 33, wire clamping mechanism A, scale 34, adjusting bolt 35, limit ring 36, spring 37, third spring 38.

DETAILED DESCRIPTION

The present disclosure will be further illustrated below with reference to the drawings and specific implementations.

Embodiment 1

As shown in FIG. 1, an installation device for air gap arrester includes a handheld pole 1, a wire clamping mechanism A provided at the bottom end of the handheld pole 1 for clamping the split wire 2, a tray 4 provided on the handheld pole 1 for lifting the arrester 3, an insulating rope 30 provided on the tray 4, a fixing rope 5 provided on the handheld pole 1 for temporarily fixing the arrester 3, and a scale 34 provided on the handheld pole 1 for measuring the distance from the bottom end of the arrester 3 to the bottom end of the handheld pole 1. An adjusting sleeve 33 is sleeved on the handheld pole 1, and an adjusting bolt 35 is threadedly connected to the adjusting sleeve 33. The end of the adjusting bolt 35 abuts against the handheld pole 1. The tray 4 is fixed on the adjusting sleeve 33.

For the wire clamping mechanism A, commercially available wire clamps for cables are used.

In this embodiment, the installation method using the above installation device for air gap arrester is as follows.

An installation method for air gap arrester includes the following steps. Step a, on the ground, slide the adjusting sleeve 33 according to the scale 34 to adjust the distance from the adjusting sleeve 33 to the bottom end of the handheld pole 1, tighten the adjusting bolt 35, place the bottom end of the arrester 3 on the tray 4, and tie the arrester 3 with the fixing rope 5. Step b, lift the arrester 3 and the installation device for the air gap arrester by a ground personnel with a pulley block to a cross arm 29, an electrician on the cross arm 29 receiving the arrester 3 and the installation device and preparing a position for installation. Step c, on the cross arm 29, confirm that the distance from the adjusting sleeve 33 to the bottom end of the handheld pole 1 is correct, pull the handheld pole 1 by an electrician, pull the insulating rope 30 by another electrician, hold the arrester 3 by yet another electrician, and lower down the arrester 3 slowly, the wire clamping mechanism A at the bottom of the handheld pole 1 clamping the split wire 2. Step d, install the low-voltage end of the arrester 3 on the cross arm 29 with bolts by the electrician; after confirming that it is correct, untie the fixing rope 5, and recover the installation device for air gap arrester.

Embodiment 2

As shown in FIGS. 2-15, this embodiment is optimized on the basis of Embodiment 1. A limit ring 36 is fixedly connected to the handheld pole 1, and the fixing rope 5 passes through the limit ring 36. A handle 27 is provided at the top end of the handheld pole 1, with a second limit protrusion 28 provided at an end of the handle 27 close to the handheld pole 1. The wire clamping mechanism A includes a bottom plate 6, and the bottom end of the handheld pole 1 is rotatably connected with a coaxial rotating shaft 31. The upper edge of the bottom plate 6 is fixed on the rotating shaft 31, and the lower edge of the bottom plate 6 is provided with a wire groove 7. Sliding sleeves 8 are slidably connected on both sides of the wire groove 7 to the bottom plate 6. The inner side wall of the sliding sleeve 8 is cylindrical and provided with annular serrations 9 coaxial with the inner side wall of the sliding sleeve 8. The serrations 9 include closely arranged teeth. The tooth includes a tooth edge 11 and a guide slope 12. Some of the guide slopes 12 are odd guide slopes, and the other of the serrations 9 are even guide slopes. The odd guide slopes and the even guide slopes are arranged at interval. An end of the even guide slope close to the wire groove 7 is provided with sliding grooves 13 extending toward the wire groove 7. A sliding rod 14 is inserted into the sliding sleeve 8 on the side away from the wire groove 7. The sliding rod 14 is cylindrical, and the outer surface of the sliding rod 14 is provided with protrusions 15 in an annular array around the axis of the sliding rod 14 that are adapted to the sliding grooves 13. The number of the protrusions 15 is the same as the number of the even guide slopes. The end of the protrusion 15 close to the wire groove 7 is provided with a second guide slope 16 that is adapted to the guide slope 12. The second guide slope 16 abuts against the bottom of the guide slope 12 or the sliding groove 13. A second sliding rod 17 of cylindrical shape is inserted into the sliding sleeve 8 at the end close to the wire groove 7, and the second sliding rod 17 is slidably connected to the sliding sleeve 8. The outer surface of the second sliding rod 17 is provided with a guiding projection 18. The inner side wall of the sliding sleeve 8 is provided with a second sliding groove 19 parallel to the axis of the inner side wall of the sliding sleeve 8. The guiding projection 18 is located inside the second sliding groove 19 and is slidably connected to the second sliding groove 19. The end of the second sliding rod 17 away from the sliding rod 14 is rotatably connected with a roller 32, and the end of the second sliding rod 17 close to the sliding rod 14 is provided with a slot 20. A spring 37 is provided in the slot 20. One end of the spring 37 is connected to the sliding rod 14, and the other end of the spring 37 is connected to the bottom of the slot 20. The end of the sliding rod 14 close to the second sliding rod 17 is inserted into the slot 20 and slidably connected to the slot 20. The end of the second sliding rod 17 close to the sliding rod 14 is provided with annular third serrations 21. The third serrations 21 include second teeth. The second tooth includes a second tooth edge 22 and a third guide slope 23 for guiding the second guide slope 16 from the guide slope 12 where it is located to the third guide slope 23 of the adjacent guide slope 12. An annular protrusion 24 is provided at the end of the inner side wall of the sliding groove 13 away from the wire groove 7. The sliding sleeve 8 is provided with a second spring. An end of the second spring abuts against the annular protrusion 24, and the other end of the second spring abuts against the protrusion 15. When the second guide slope 16 is at the bottom of the sliding groove 13, the second guide slope 16 abuts against the third guide slope 23. The bottom plate 6 is provided with a limit protruding bar 25 for preventing the sliding sleeve 8 from sliding along the bottom plate 6 and preventing the second sliding rod 17 from sliding along the sliding sleeve 8. The length direction of the limit protruding bar 25 is consistent with the sliding direction of the sliding sleeve 8. When the second guide slope 16 abuts against the guide slope 12, the sliding rod 14 abuts against the bottom end of the limit protruding bar 25. When the second guide slope 16 abuts against the bottom of the sliding groove 13, the sliding rod 14 abuts against the side surface of the limit protruding bar 25. The bottom plate 6 is provided with a third spring 38 for driving the sliding sleeve 8 to slide in the direction towards the handheld pole 1. A fixing block 26 is fixedly connected to the bottom plate 6. The fixing block 26 is located on the side of the sliding sleeve 8 close to the handheld pole 1. The third spring 38 is located between the fixing block 26 and the sliding sleeve 8, and two ends of the third spring 38 are respectively connected to the fixing block 26 and the sliding sleeve 8.

First, the wire clamping mechanism A will be described. The sliding sleeve 8, the sliding rod 14, and the second sliding rod 17 move similarly to a ballpoint pen. In the initial state, the rollers 32 corresponding to the sliding sleeves 8 on both sides of the line groove 7 abut against each other. The second guide slope 16 abuts against the odd guide slope, and the guide projection 18 abuts against the end of the second sliding groove 19 away from the sliding rod 14. At this time, the second sliding rod 17 abuts against the bottom of the limit protruding bar 25. When the second sliding rod 17 moves toward the sliding sleeve 8 under corresponding force, the guide projection 18 slides along the second sliding groove 19, and the spring 37 is compressed. The third guide slope 23 moves toward the second guide slope 16, the third guiding slope 23 meets the second guiding slope 16, and then the third guiding slope 23 pushes the second guiding slope 16 to move along the tooth edge 11. Under the action of the third guiding slope 23, the second guiding slope 16 and the corresponding tooth edge 11 are under pressure. Under the obstruction of the tooth edge 11, the second guide slope 16 will not slide on the third guide slope 23. The protrusion 15 slides along the tooth edge 11. When the protrusion 15 is released from the tooth edge 11, the second guide slope 16 slides along the third guide slope 23 to the junction of the second tooth edge 22 and the third guide slope 23. The sliding rod 14 rotates for a certain angle, and then the force pushing the second sliding rod 17 to move toward the sliding sleeve 8 disappears. Under the action of the second spring, the protrusion 15 moves toward the second sliding rod 17, driving the second sliding rod 17 to move away from the sliding sleeve 8. When the second guide slope 16 abuts against the even guide slope, the second guide slope 16 is separated from the third guide slope 23. The second guide slope 16 slides along the even guide slope to the sliding groove 13, and then moves along the sliding groove 13 to the bottom of the sliding groove. When the second guide slope 16 moves to the bottom of the sliding groove, the second guide slope 16 abuts against the third guide slope 23 again. Compared with the initial state, the sliding rod 14 moves toward the sliding sleeve 8 for a certain distance. That is, the length of the sliding rod 14 exposed outside the sliding sleeve 8 is "shortened". In addition, under the action of the spring 37, the guide projection 18 slides to the initial position along the second sliding groove 19, and the rollers 32 abut against each other again.

When the second sliding rod 17 receives the force toward the sliding sleeve again, the second sliding rod 17 moves toward the sliding sleeve 8. When the second guide slope 16 meets the third guide slope 23, the second guide slope 16 is pushed by the third guide slope 23, and the second guide slope 16 moves along the tooth edge 11. When the second guide slope 16 is released from the tooth edge 11, the second guide slope 16 slides along the third guide slope 23 and moves to the junction of the third guide slope 23 and the second tooth edge 22. At this time, the sliding rod 14 rotates for a certain angle, and then the second sliding rod 17 moves away from the sliding rod 14. Under the action of the second spring, the protrusion 15 moves in a direction toward the second sliding rod 17. When the second guide slope 16 abuts against the odd guide slope, the second guide slope 16 is released from the third guide slope 23, and finally the second guide slope 16 moves to the junction of the odd guide slope and the tooth edge 11. Under the action of the spring 37, the guide protrusion 18 returns to the initial position, and the rollers 32 abut against each other again. The length of the sliding rod 14 exposed outside the sliding sleeve 8 is "lengthened" again.

With this reciprocation, each time the second sliding rod 17 "stretches out and draws back", the length of the sliding rod 14 exposed outside the sliding sleeve 8 switches back and forth between "long" and "short".

In this embodiment, the arrester installation method using the above installation device for air gap arrester is as follows.

An installation method for air gap arrester includes the following steps. Step a, on the ground, slide the adjusting sleeve 33 to adjust the distance from the adjusting sleeve 33 to the bottom end of the handheld pole 1, tighten the adjusting bolt 35, place the bottom end of the arrester 3 on the tray 4, and tie the arrester 3 by the fixing rope 5 passing through the limit ring 36. Step b, lift the arrester 3 and the installation device for the air gap arrester by the ground personnel with a pulley block to a cross arm 29, the electrician on the cross arm 29 receiving the arrester 3 and the installation device and preparing a position for installation. Step c, on the cross arm 29, confirm that the distance from the adjusting sleeve 33 to the bottom end of the handheld pole 1 is correct, pull the handheld pole 1 by an electrician, pull the insulating rope 30 by another electrician, hold the arrester 3 by yet another electrician and lower down the arrester 3 slowly. The rollers 32 meet the split wire 2 located between the rollers 32. The split wire 2 squeezes and separates the rollers, and the rollers squeeze the corresponding second sliding rods 17. When the rollers 32 move downwards, they are first separated by the split wire 2 and then brought together. At this time, the second sliding rod 17 completes one time of "stretching out and drawing back", and the length of the sliding rod 14 exposed outside the sliding sleeve 8 becomes shorter. The end surface of the sliding rod 14 is flush with the corresponding side of the limit protruding bar 25. Under the action of the third spring 38, the sliding sleeve 8 moves toward the handheld pole 1, the sliding rod 14 slides against the limit protruding bar 25, and the roller 32 moves upward. Finally, the split wire 2 is squeezed to the bottom of the wire groove 7 and is thereby clamped. When the handheld pole 1 shakes, since the third guide slope 23 and the second guide slope 16 abut against each other at this time, the third guide slope 23 cannot push the second guide slope 16 when the roller wants to move toward the sliding sleeve 8. The reason is that the limit protruding bar 25 resists the second sliding rod 17 to prevent the wire clamping mechanism A from loosening the spit wire 2. Step d, install the low-voltage end of the arrester 3 on the cross arm 29 with bolts by the electrician; after confirming that it is correct, untie the fixing rope 5, and then rotate the handheld pole 1. At this time, the wire clamping mechanism A is stationary. The tray 4 is turned for 180 degrees to avoid the arrester 3, so as to prevent it from driving the arrester when pulled upwards. Then pull the handheld pole 1 is upwards strongly. The split wire 2 pushes the roller 32 to move toward the opening of the wire groove 7, and the second sliding rod 17 slides on the limit protruding bar 25. When the second sliding rod 17 moves to the end of the limit protruding bar 25, the rollers 32 are separated by the split wire 2 and then brought together. The clamping mechanism A is separated from the split wire 2, and the second sliding rod 17 completes one time of "stretching out and drawing back". The length of the sliding rod 14 exposed outside the sliding sleeve 8 becomes longer again, and the sliding rod 14 abuts against the bottom end of the limit protruding bar 25 again. The recovery of the installation device for the air gap arrester is thus completed.

What is claimed is that:

1. An installation device for air gap arrester, comprising a handheld pole, a wire clamping mechanism provided at a bottom end of the handheld pole for clamping a split wire, a tray provided on the handheld pole for lifting the arrester, an insulating rope provided on the tray, a fixing rope provided on the handheld pole for temporarily fixing the arrester, and a scale provided on the handheld pole for measuring the distance from a bottom end of the arrester to the bottom end of the handheld pole.

2. An installation method for the installation device for air gap arrester of claim 1, comprising:
   step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
   step b, lift the arrester and the installation device for the air gap arrester by a ground personnel with a pulley block to a cross arm, the electrician on the cross arm receiving the arrester and the installation device and preparing a position for installation;
   step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
   step d, install a low-voltage end of the arrester on the cross arm with bolts by the electrician; after confirming that it is correct, untie the fixing rope, and recover the installation device for air gap arrester.

3. The installation device for air gap arrester of claim 1, wherein an adjusting sleeve is sleeved on the handheld pole, an adjusting bolt is threadedly connected to the adjusting sleeve, an end of the adjusting bolt abuts against the handheld pole, and the tray is fixedly connected to the adjusting sleeve.

4. An installation method for the installation device for air gap arrester of claim 3, comprising:
   step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
   step b, lift the arrester and the installation device for the air gap arrester by a ground personnel with a pulley block to a cross arm, the electrician on the cross arm receiving the arrester and the installation device and preparing a position for installation;
   step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
   step d, install a low-voltage end of the arrester on the cross arm with bolts by the electrician; after confirming that it is correct, untie the fixing rope, and recover the installation device for air gap arrester.

5. The installation device for air gap arrester of claim 1, wherein a limit ring is fixedly connected to the handheld pole, and the fixing rope passes through the limit ring.

6. An installation method for the installation device for air gap arrester of claim 5, comprising:
   step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
   step b, lift the arrester and the installation device for the air gap arrester by a ground personnel with a pulley block to a cross arm, the electrician on the cross arm receiving the arrester and the installation device and preparing a position for installation;
   step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
   step d, install a low-voltage end of the arrester on the cross arm with bolts by the electrician; after confirming that it is correct, untie the fixing rope, and recover the installation device for air gap arrester.

7. The installation device for air gap arrester of claim 1, wherein a handle is provided at a top end of the handheld pole, and a second limit protrusion is provided at an end of the handle close to the handheld pole.

8. An installation method for the installation device for air gap arrester of claim 7, comprising:
   step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
   step b, lift the arrester and the installation device for the air gap arrester by a ground personnel with a pulley block to a cross arm, the electrician on the cross arm receiving the arrester and the installation device and preparing a position for installation;
   step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
   step d, install a low-voltage end of the arrester on the cross arm with bolts by the electrician; after confirming that it is correct, untie the fixing rope, and recover the installation device for air gap arrester.

9. The installation device for air gap arrester of claim 1, wherein the wire clamping mechanism includes a bottom plate, a lower edge of the bottom plate is provided with a wire groove, and sliding sleeves are slidably connected on both sides of the wire groove to the bottom plate; an inner side wall of the sliding sleeve is cylindrical and provided with annular serrations coaxial with the inner side wall of the sliding sleeve; the serrations include closely arranged teeth; a tooth includes a tooth edge and a guide slope; some of the guide slopes are odd guide slopes, and the other of the serrations are even guide slopes; the odd guide slopes and the even guide slopes are arranged at interval; an end of the even guide slope close to the wire groove is provided with sliding grooves extending toward the wire groove; a sliding rod is inserted into the sliding sleeve on a side away from the wire groove; the sliding rod is cylindrical, and an outer surface of the sliding rod is provided with protrusions in an annular array around an axis of the sliding rod that are adapted to the sliding grooves; the number of the protrusions is the same as the number of the even guide slopes; an end of the protrusion close to the wire groove is provided with a second guide slope that is adapted to the guide slope; the second guide slope abuts against a bottom of the guide slope or the sliding groove; a second sliding rod of cylindrical shape is inserted into the sliding sleeve at an end close to the wire groove, and the second sliding rod is slidably connected to the sliding sleeve; an outer surface of the second sliding rod is provided with a guiding projection; the inner side wall of the sliding sleeve is provided with a second sliding groove parallel to the axis of the inner side wall of the sliding sleeve; the guiding projection is located inside the second sliding groove and is slidably connected to the second sliding groove; an end of the second sliding rod away from the sliding rod is rotatably connected with a roller, and an end of the second sliding rod close to the sliding rod is provided with a slot; a spring is provided in the slot, an end of the spring is connected to the sliding rod and the other end of the spring is connected to the bottom of the slot; an end of the second sliding rod close to the sliding rod is provided with annular third serrations; the third serrations include second teeth, and the second tooth includes a second tooth edge and a third guide slope for guiding the second guide slope from the guide slope where it is located to the third guide slope of an adjacent guide slope; an annular protrusion is provided at an end of the inner side wall of the sliding groove away from the wire groove; the sliding sleeve is provided with a second spring, an end of the second spring abuts against the annular protrusion, and the other end of the second spring abuts against the protrusion; when the second guide slope is at the bottom of the sliding groove, the second guide slope abuts against the third guide slope; the bottom plate is provided with a limit protruding bar for preventing the sliding sleeve from sliding along the bottom plate and preventing the second sliding rod from sliding along the sliding sleeve; the bottom plate is provided with a third spring for driving the sliding sleeve to slide in a direction towards the handheld pole.

10. An installation method for the installation device for air gap arrester of claim 9, comprising:
    step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
    step b, lift the arrester and the installation device for the air gap arrester by a ground personnel with a pulley block to a cross arm, the electrician on the cross arm receiving the arrester and the installation device and preparing a position for installation;
    step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
    step d, install a low-voltage end of the arrester on the cross arm with bolts by the electrician; after confirming that it is correct, untie the fixing rope, and recover the installation device for air gap arrester.

11. The installation device for air gap arrester of claim 9, wherein a fixing block is fixedly connected to the bottom plate; the fixing block is located on a side of the sliding sleeve close to the handheld pole; the third spring is located between the fixing block and the sliding sleeve, and two ends of the third spring are respectively connected to the fixing block and the sliding sleeve.

12. An installation method for the installation device for air gap arrester of claim 11, comprising:
    step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
    step b, lift the arrester and the installation device for the air gap arrester by a ground personnel with a pulley block to a cross arm, the electrician on the cross arm receiving the arrester and the installation device and preparing a position for installation;
    step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
    step d, install a low-voltage end of the arrester on the cross arm with bolts by the electrician; after confirming that it is correct, untie the fixing rope, and recover the installation device for air gap arrester.

13. The installation device for air gap arrester of claim 9, wherein a length direction of the limit protruding bar is consistent with a sliding direction of the sliding sleeve; when the second guide slope abuts against the guide slope, the sliding rod abuts against a bottom end of the limit protruding bar, and when the second guide slope abuts against a bottom of the sliding groove, the sliding rod abuts against a side surface of the limit protruding bar.

14. An installation method for the installation device for air gap arrester of claim 13, comprising:
    step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
    step b, lift the arrester and the installation device for the air gap arrester by a ground personnel with a pulley block to a cross arm, the electrician on the cross arm receiving the arrester and the installation device and preparing a position for installation;
    step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
    step d, install a low-voltage end of the arrester on the cross arm with bolts by the electrician; after confirming that it is correct, untie the fixing rope, and recover the installation device for air gap arrester.

15. The installation device for air gap arrester of claim 9, wherein the bottom end of the handheld pole is rotatably connected to a coaxial shaft, and an upper edge of the bottom plate is fixedly connected to the shaft.

16. An installation method for the installation device for air gap arrester of claim 15, comprising:
    step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;
    step b, lift the arrester and the installation device for the air gap arrester by a ground personnel with a pulley block to a cross arm, the electrician on the cross arm receiving the arrester and the installation device and preparing a position for installation;
    step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and
    step d, install a low-voltage end of the arrester on the cross arm with bolts by the electrician; after confirming that it is correct, untie the fixing rope, and recover the installation device for air gap arrester.

17. The installation device for air gap arrester of claim 9, wherein an end of the sliding rod close to the second sliding rod is inserted into the slot and slidably connected to the slot.

18. An installation method for the installation device for air gap arrester of claim 17, comprising:

step a, on the ground, slide the adjusting sleeve to adjust a distance from the adjusting sleeve to the bottom end of the handheld pole, tighten the adjusting bolt, place a bottom end of the arrester on the tray, and tie the arrester with the fixing rope passing through the limit ring;

step b, lift the arrester and the installation device for the air gap arrester by a ground personnel with a pulley block to a cross arm, the electrician on the cross arm receiving the arrester and the installation device and preparing a position for installation;

step c, on the cross arm, confirm that the distance from the adjusting sleeve to the bottom end of the handheld pole is correct, pull the handheld pole by an electrician, pull the insulating rope by another electrician, hold the arrester by yet another electrician, and lower down the arrester slowly, the wire clamping mechanism at the bottom of the handheld pole clamping the split wire; and step d, install a low-voltage end of the arrester on the cross arm with bolts by the electrician; after confirming that it is correct, untie the fixing rope, and recover the installation device for air gap arrester.

* * * * *